UNITED STATES PATENT OFFICE.

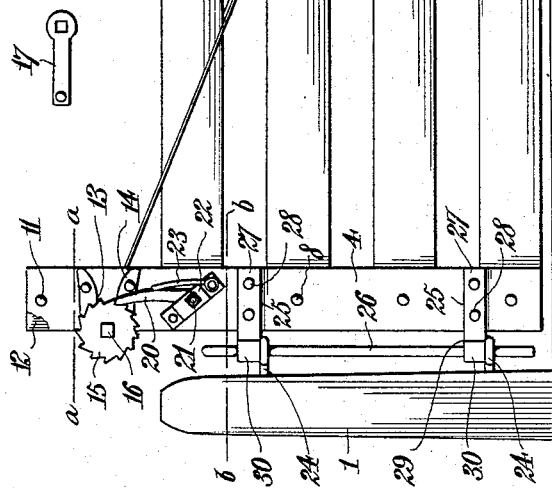

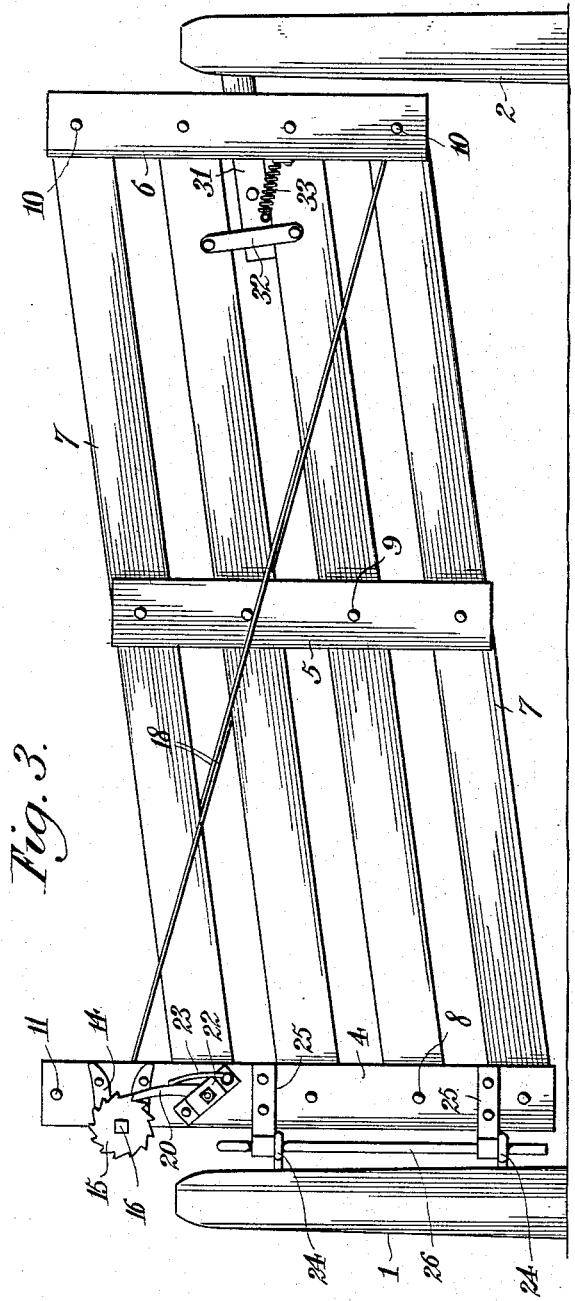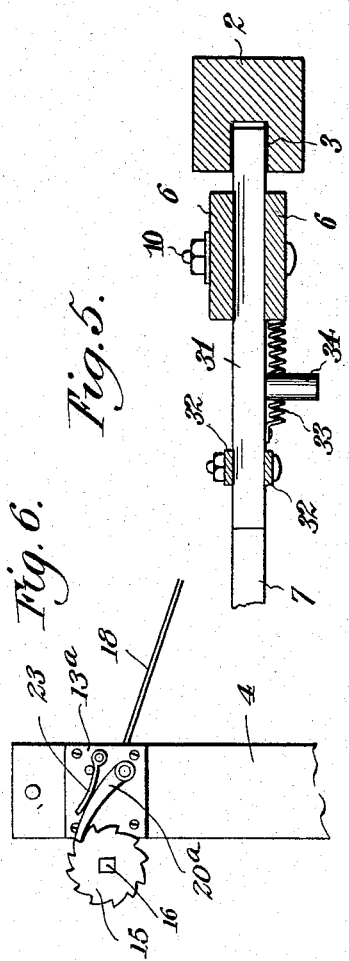

GEORGE SHIMP, OF PATOKA, ILLINOIS.

FARM-GATE.

1,175,185.  Specification of Letters Patent.  Patented Mar. 14, 1916.

Application filed March 20, 1914. Serial No. 826,083.

*To all whom it may concern:*

Be it known that I, GEORGE SHIMP, a legal citizen of the United States, residing at Patoka, in the county of Marion and State of Illinois, have invented new and useful Improvements in Farm-Gates, of which the following is a specification.

This invention is an improved farm gate which may be arranged in a horizontal position for ordinary use and the free end of which may, if desired be raised to permit the passage of small animals thereunder when the gate is closed, one object of the invention being to provide improvements in the construction of the gate; another object being to effect improved means for holding the gate in either horizontal or inclined position; another object being to effect improvements in the means for hinging the gate and another object being to effect improvements in the latch.

The invention consists in the construction, combination and arrangement of devices hereinafter described and claimed.

In the accompanying drawings:—Figure 1 is a side elevation of a farm gate constructed in accordance with my invention and showing the same in normal lowered position and closed. Fig. 2 is a detail horizontal sectional view of the same on the plane indicated by the line $a$—$a$ of Fig. 1. Fig. 3 is an elevation of the same in inclined position, with its free end raised to permit the passage of small animals thereunder and showing the gate in closed position. Fig. 4 is a detail horizontal sectional view on the plane indicated by the line $b$—$b$ of Fig. 1. Fig. 5 is a similar view on the plane indicated by the line $c$—$c$ of Fig. 1. Fig. 6 is a detail elevation showing a modification.

In the drawings the hinge post is indicated at 1 and the latching post at 2, said latching post being provided on the side next the hinge post with a vertical groove 3. The gate has a pair of vertical inner end bars 4, a pair of vertical intermediate bars 5 and a pair of outer end bars 6. The bars 7 of the gate are arranged between the members of the pairs of vertical bars 4—5—6 and are pivotally connected thereto as by means of bolts 8—9—10. Hence the gate is rendered flexible so that it may be arranged with its bars 7 either in horizontal position or in inclined position with the outer end of the gate elevated. The inner bars 4 project upwardly above the top bar 7 and are connected together by a bolt 11 and a suitable spacer 12.

A winch 13 is arranged at the inner end of the gate, above the upper bar 7 thereof and has its bearings in a pair of brackets 14 which are secured on the outer sides of the vertical bars 4 and project from the outer side thereof. This winch is provided with a ratchet wheel 15 and also has a cross sectionally rectangular end 16 which is engaged by a crank 17, by means of which the winch may be turned. A pair of supporting and elevating cords 18, which in practice may be wire cables of suitable size are attached to the bolt 10 at the lower outer corner of the gate and pass upwardly and inwardly on the gate, on opposite sides thereof and between the upper portions of the vertical inner bars 4 and are attached to the winch as at 19. Hence by turning the winch in the required direction the said cords may be partly wound thereon or paid out therefrom to raise or lower the outer end of the gate as may be desired, thus permitting the gate to be arranged either in horizontal position as shown in Fig. 1 or in an inclined position as shown in Fig. 3. To secure the gate in adjusted position I provide a pawl 20 to engage the ratchet wheel 15 and which is pivotally mounted as at 21 on a clip 22 which is secured on the outer side of one of the vertical bars 4. A spring 23 is secured to the clip and bears against the pawl to keep the latter normally in engaged position.

To hinge the gate to the post 1 I provide a pair of eye bolts 24, a pair of U-shaped hinged brackets 25 and a pintle rod 26. The eye bolts are screwed in the post 1 and arranged so that their eyes project from said post. The hinge brackets are arranged with their arms 27 astride of and bolted to the outer sides of the vertical bars 4 as at 28 and are formed with arms 29 each of which has an eye 30 arranged coincident with the eye of one of the eye bolts. The pintle rod 26 is inserted in the eyes of the hinge brackets and eye bolts and coacts therewith to hingedly support the gate and permit it to be swung freely in either direction. The gate may be readily dismounted when desired by first merely withdrawing the pintle rod 26.

A latch 31 is arranged at the outer end of the gate for sliding movement between the vertical bars 6 and also between a pair of guides 32 which connect two of the bars 7 and are secured on opposite sides of the said bars as shown. This latch may be engaged with the vertical groove 3 of the post 2 and is normally held in engagement therewith, when the gate is in closed position, by means of a spring 33 whether the gate be in horizontal position or in inclined position with its free end elevated, the spring 33 compensating for the angular movement of the gate and preventing the latch 31 from becoming casually disengaged from the groove 3 when the gate is in raised position. A suitable handle or other device such as indicated at 34 is provided to enable the latch to be removed from the groove 3 when it is desired to open the gate.

In Fig. 6 I show a modification in which the pawl 20$^a$ is pivotally mounted directly on the plate 13$^a$.

Having thus described my invention, I claim:—

A gate comprising a pair of inner vertical end bars, a pair of outer vertical end bars, longitudinal bars arranged between and pivotally connected to said end bars said inner end bars extending above the uppermost longitudinal bar of the gate, a winch mounted on said bars and extending across the space between them and cords on opposite sides of the gate attached thereto near the lower outer corner and also attached to the winch at points between said inner end bars, the said cords being crossed between certain of the longitudinal bars of the gate.

In testimony whereof I affix my signature in presence of two witnesses.

GEORGE SHIMP.

Witnesses:
MAE SIMCOX,
E. H. THALMAR.

Copies of this patent may be obtained for five cents each, by addressing the "Commissioner of Patents, Washington, D. C."